US011992919B2

(12) United States Patent
Lai

(10) Patent No.: US 11,992,919 B2
(45) Date of Patent: May 28, 2024

(54) TORQUE WRENCH

(71) Applicant: Shih-Hao Lai, Taichung (TW)

(72) Inventor: Shih-Hao Lai, Taichung (TW)

( * ) Notice: Subject to any disclaimer, the term of this patent is extended or adjusted under 35 U.S.C. 154(b) by 178 days.

(21) Appl. No.: 17/693,842

(22) Filed: Mar. 14, 2022

(65) Prior Publication Data

US 2022/0297268 A1 Sep. 22, 2022

(30) Foreign Application Priority Data

Mar. 18, 2021 (TW) ................................ 110109723
Feb. 15, 2022 (TW) ................................ 111105474

(51) Int. Cl.
*B25B 23/142* (2006.01)
*B25B 13/46* (2006.01)

(52) U.S. Cl.
CPC ........ *B25B 13/463* (2013.01); *B25B 23/1425* (2013.01); *B25B 23/1427* (2013.01)

(58) Field of Classification Search
CPC . B25B 23/141; B25B 23/142; B25B 23/1425; B25B 23/1427; B25B 13/463
USPC ................................................ 81/62, 483
See application file for complete search history.

(56) References Cited

U.S. PATENT DOCUMENTS 6,928,885 B1 8/2005 Shiao et al.
7,503,228 B1 * 3/2009 Hsieh .................. B25B 23/1425 73/862.26
7,540,220 B2 6/2009 Shiao
8,264,374 B2 9/2012 Obatake et al.
10,625,405 B2 4/2020 Silha et al.
10,821,580 B2 11/2020 Hsieh
2005/0072278 A1 4/2005 Cutler et al.
2008/0127748 A1 6/2008 Liao
2012/0132042 A1 5/2012 Bruce
2014/0047957 A1 * 2/2014 Wu ..................... B25B 23/1427 81/467
2014/0338419 A1 * 11/2014 Hsieh .................... G01L 25/003 81/477
2016/0288304 A1 * 10/2016 Shiao ................. B25B 23/1425
2018/0149533 A1 5/2018 Hu et al.

FOREIGN PATENT DOCUMENTS

CA 2495989 A1 8/2005
CA 2984320 A1 5/2010
CN 102241004 A 11/2011
CN 103624729 B 11/2015
CN 104723260 B 4/2017
CN 110861025 A 3/2020
EP 2636385 A1 9/2013
TW M280892 U 11/2005
(Continued)

*Primary Examiner* — Eric J Rosen
*Assistant Examiner* — Robert C Moore
(74) *Attorney, Agent, or Firm* — Muncy, Geissler, Olds & Lowe, P.C.

(57) ABSTRACT

A torque wrench includes a body and a measuring device. The body includes a head portion and a rod portion. An end of the rod portion is connected with the head portion. The measuring device includes a strain gauge seat and a strain gauge. The strain gauge seat is arranged in the rod portion and is provided with a first recess and a deformation portion adjacent to the first recess. The strain gauge is connected to the deformation portion, thereby obtaining a precise torque value.

14 Claims, 18 Drawing Sheets

(56) References Cited

FOREIGN PATENT DOCUMENTS

| | | | |
|---|---|---|---|
| TW | 200607612 | A | 3/2006 |
| TW | I276516 | B | 3/2007 |
| TW | I277494 | B | 4/2007 |
| TW | I280182 | B | 5/2007 |
| TW | 200800511 | A | 1/2008 |
| TW | M325901 | U | 1/2008 |
| TW | M341585 | U | 10/2008 |
| TW | M406497 | U | 7/2011 |
| TW | I364351 | B | 5/2012 |

* cited by examiner

TORQUE WRENCH

BACKGROUND

The present invention relates to a wrench and, more particular, to a torque wrench.

U.S. Pat. No. 10,821,580 discloses an electronic torque wrench with sensing structure, which includes a tubular body, a working head and at least one sensing element. The working head further includes a head section and a connection section secured in the front end of the tubular body. The head section is positioned at the front end of the tubular body. The sensing element is disposed on an outer circumference of the tubular body.

In general, the operation method of the electronic torque wrench is to set the strain gauge in the wrench handle tube or other components, and use the strain gauge to obtain the torque value output by the wrench through a specific formula conversion. The above torque wrench is to set the sensing element on the outer circumference of the tubular body. However, when measuring the strain value of the torque wrench tubular body or other components that provide structural rigidity, errors are likely to occur, and it is not easy to obtain accurate torque values.

SUMMARY

An objective of the present invention is to provide a torque wrench, which includes a body and a measuring device. The body includes a head portion and a rod portion. An end of the rod portion is connected with the head portion. The measuring device includes a strain gauge seat and a strain gauge. The strain gauge seat is arranged in the rod portion and is provided with a first recess and a deformation portion adjacent to the first recess. The strain gauge is connected to the deformation portion.

The present invention will become clearer in light of the following detailed description of illustrative embodiments of this invention described in connection with the drawings.

DETAILED DESCRIPTION

Figure 1:
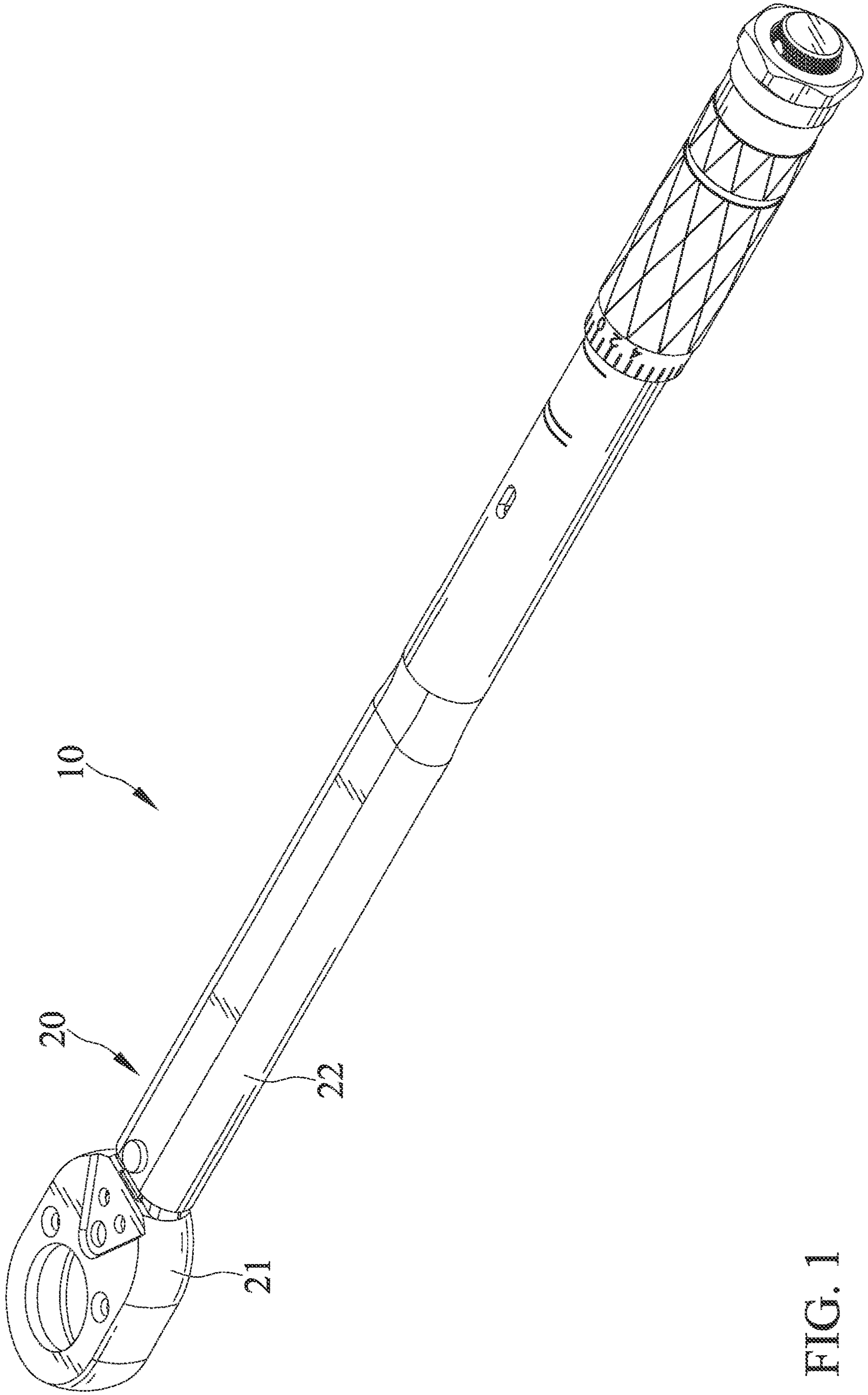
FIG. 1 is a perspective view of a torque wrench of a first embodiment according to the present invention.
Figure 2:
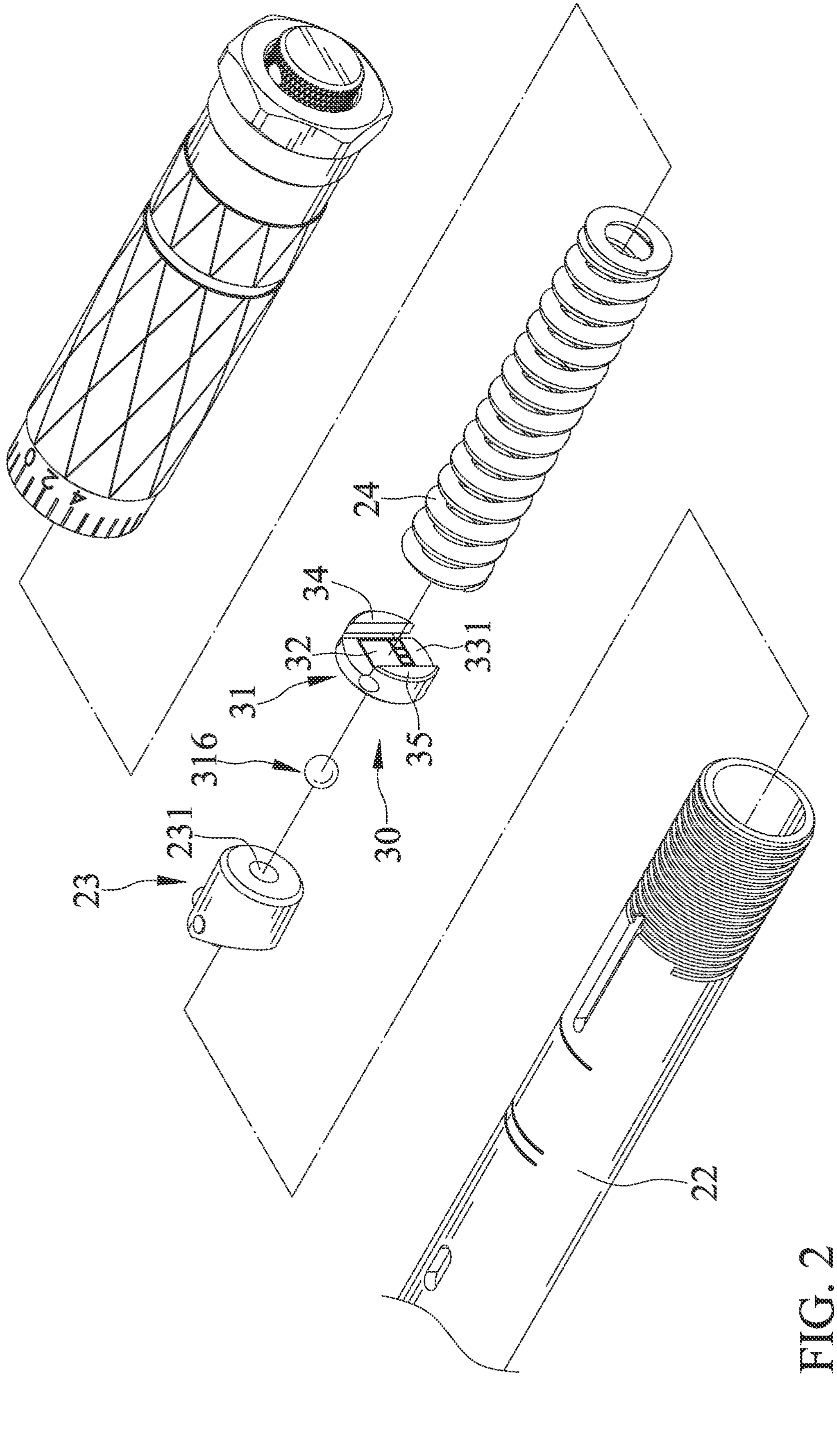
FIG. 2 is an exploded perspective view of the torque wrench of the first embodiment according to the present invention.
Figure 3:
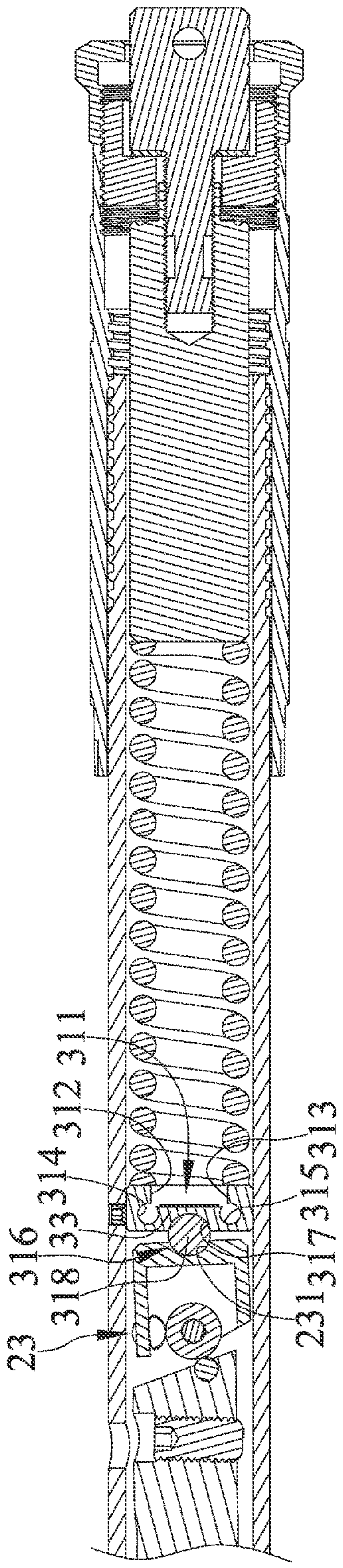
FIG. 3 is a cross sectional view of the torque wrench of the first embodiment according to the present invention.

FIGS. 1-3 show a torque wrench of a first embodiment according to the present invention. The torque wrench 10 includes a body 20 and a measuring device 30.

The body 20 includes a head portion 21 and a rod portion 22. An end of the rod portion 22 is connected with the head portion 21.

The measuring device 30 includes a strain gauge seat 31 and a strain gauge 32. The strain gauge seat 31 is arranged in the rod portion 22 and is provided with a first recess 311 and a deformation portion 33 adjacent to the first recess 311. An inner periphery of the first recess 311 is provided with a first face 312 and a second face 313 faced to the first face 312. A side of the deformation portion 33 adjacent to the first recess 311 is provided with a third face 331 arranged between the first face 312 and the second face 313. The strain gauge 32 is connected to the deformation portion 33.

The strain gauge seat 31 is provided with a second recess 314 and a third recess 315. The second recess 314 is arranged between the first face 312 and the third face 331 so that the first face 312 and the third face 331 are not connected with each other. The second recess 314 communicates with the first recess 311. The third recess 315 is arranged between the second face 313 and the third face 331 so that the second face 313 and the third face 331 are not connected with each other. The third recess 315 communicates with the first recess 311.

The strain gauge seat 31 is provided with an abutting portion 316, and the abutting portion 316 has a raised structure with a convex arc surface.

The strain gauge seat 31 is provided with a first leg 34 and a second leg 35. The first recess 311 is arranged between the first leg 34 and the second leg 35. The first leg 34 and the second leg 35 are respectively integrally connected to the deformation portion 33 as a monolithic structure. The first face 312 is arranged at a side of the first leg 34 adjacent to the first recess 311. The second face 313 is arranged at a side of the second leg 35 adjacent to the first recess 311.

The body 20 is provided with a tripping mechanism 23 and an elastic member 24. The elastic member 24 is arranged at a side of the tripping mechanism 23 opposite to the head portion 21. A side of the first leg 34 opposite to the deformation portion 33 and a side of the second leg 35 opposite to the deformation portion 33 are respectively abutted against the elastic member 24. The strain gauge 32 is connected to the third face 331 and is faced to the elastic member 24. A side of the strain gauge seat 31 opposite to the elastic member 24 is abutted against the tripping mechanism 23.

The tripping mechanism 23 is provided with a receiving slot 231. The abutting portion 316 is arranged at a side of the deformation portion 33 opposite to the strain gauge 32. The abutting portion 316 includes a containing slot 317 and an abutting member 318. The containing slot 317 is recessed in the deformation portion 33. In the embodiment, the abutting member 318 is spherical, and the abutting member 318 is arranged in the receiving slot 231 and the containing slot 317. The abutting member 318 simultaneously abuts against an inner surface of the receiving slot 231 and an inner surface of the containing slot 317 in a surface contact manner.

In the embodiment, the tripping mechanism 23 is an unidirectional tripping mechanism.

Thus, the torque wrench 10 can make the torque value measured by the measuring device 30 accurate. The shape and structure of the strain gauge seat 31 can produce regular micro-deformation when subjected to force, thereby reducing the error of the measurement data of the strain gauge 32 to improve the accuracy of the torque value measured by the measuring device 30.

Figure 4:
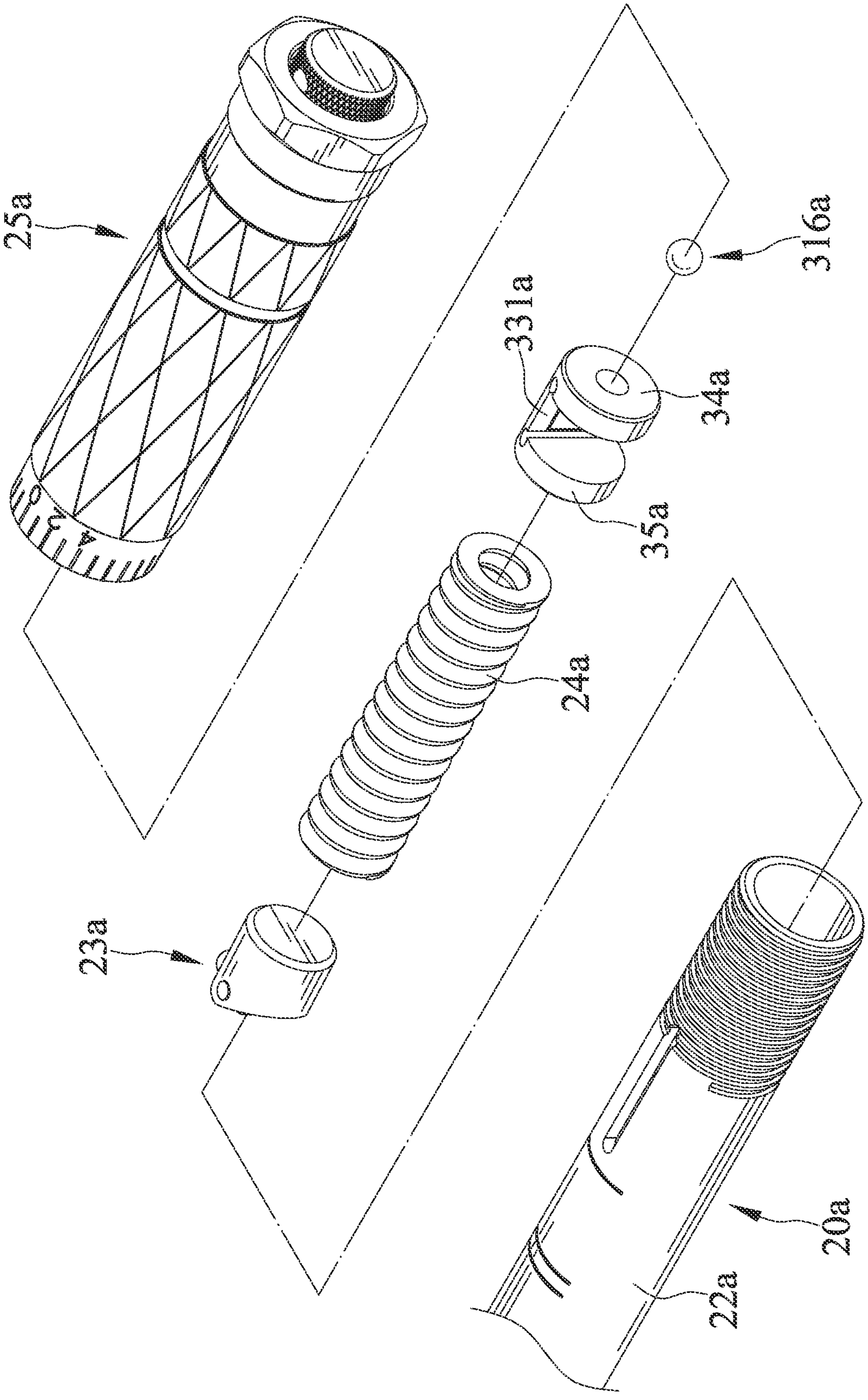
FIG. 4 is an exploded perspective view of a torque wrench of a second embodiment according to the present invention.
Figure 5:
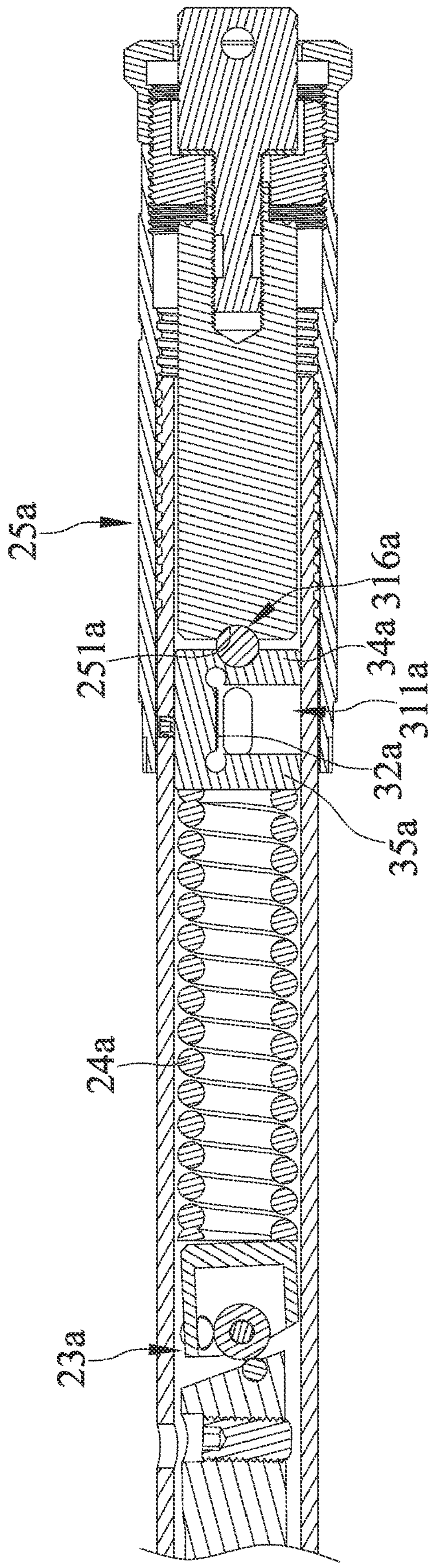
FIG. 5 is a cross sectional view of the torque wrench of the second embodiment according to the present invention.

FIGS. 4 and 5 show a torque wrench of a second embodiment according to the present invention. The second embodiment is substantially the same as the first embodiment but is mainly different from the first embodiment by that the body 20*a* is provided with a tripping mechanism 23*a*, an elastic member 24*a* and an adjustable mechanism 25*a*. The elastic member 24*a* is arranged at a side of the tripping mechanism 23*a* opposite to the head portion 21. The elastic member 24*a* abuts against the tripping mechanism 23*a*. The adjustable mechanism 25*a* is arranged at a side of the elastic member 24*a* opposite to the tripping mechanism 23*a*. The first leg 34*a* is abutted against the adjustable mechanism 25*a*. The second leg 35*a* is abutted against the elastic member 24*a*. The strain gauge 32*a* is connected to the third face 331*a* and is faced to an inner periphery of the rod portion 22*a*.

The adjustable mechanism 25*a* is provided with a receiving slot 251*a*. The abutting portion 316*a* is arranged at a side of the first leg 34*a* opposite to the first recess 311*a*. In the embodiment, the abutting portion 316*a* has a spherical surface and is arranged in the receiving slot 251*a*. The abutting portion 316*a* abuts against an inner surface of the receiving slot 251*a* in a surface contact manner.

Figure 6:
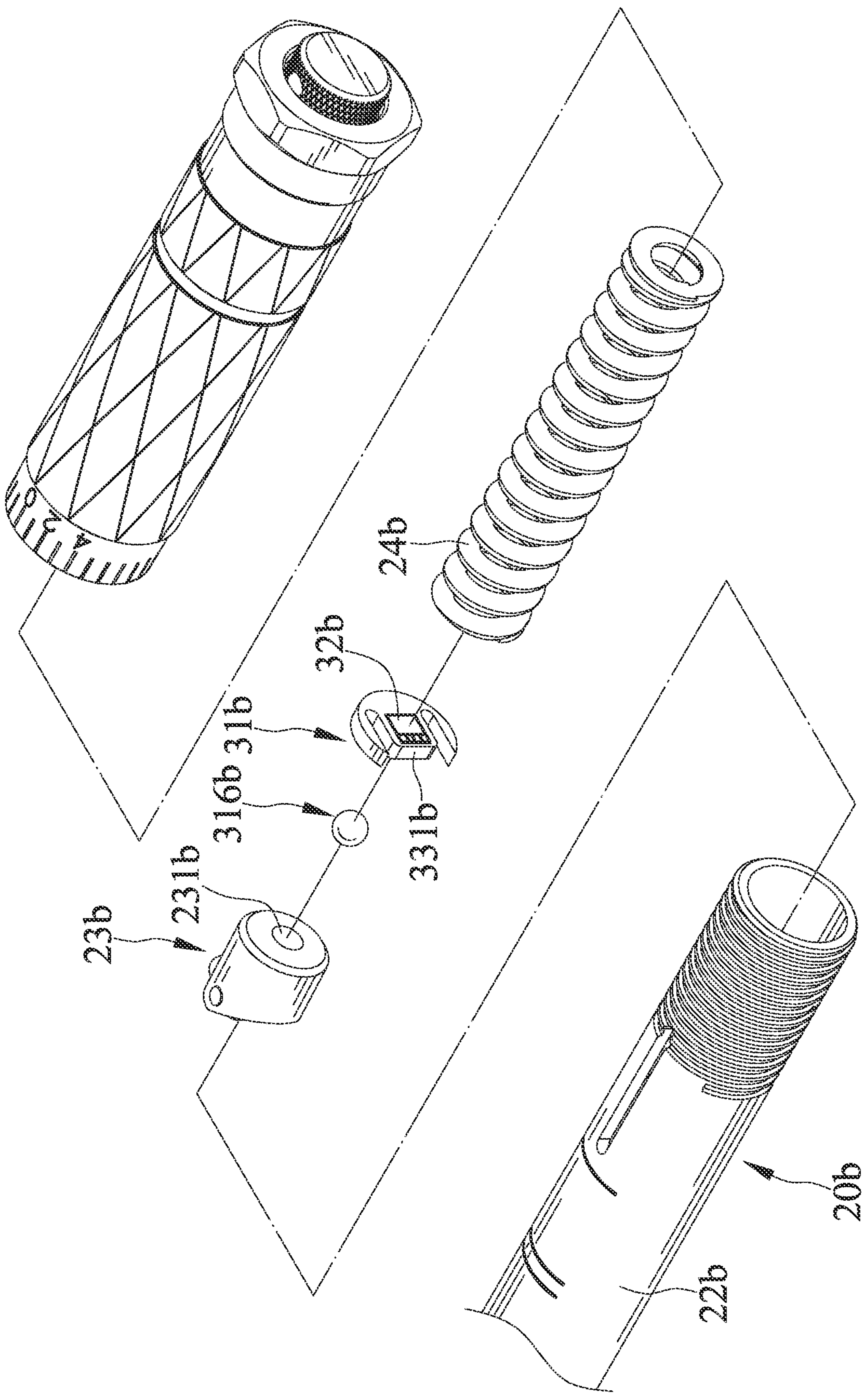
FIG. 6 is an exploded perspective view of a torque wrench of a third embodiment according to the present invention.
Figure 7:
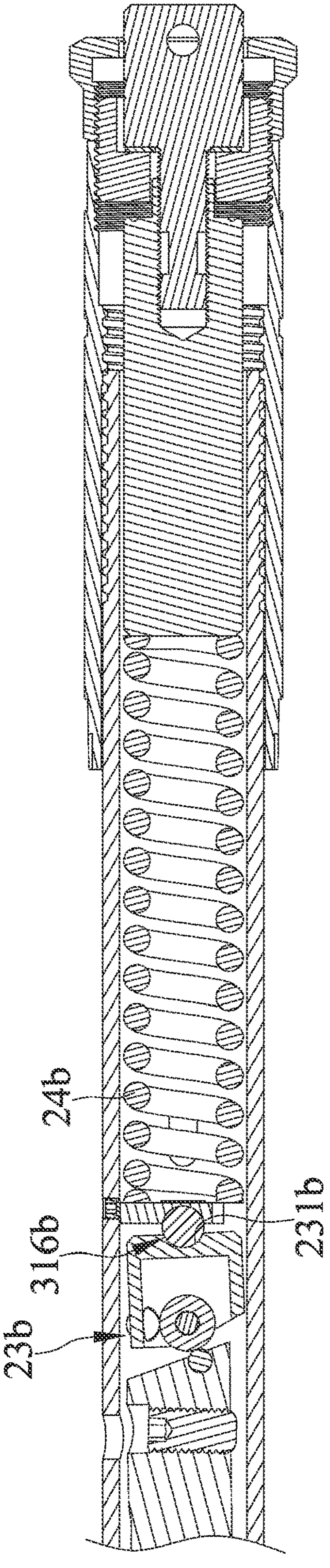
FIG. 7 is a cross sectional view of the torque wrench of the third embodiment according to the present invention.
Figure 8:
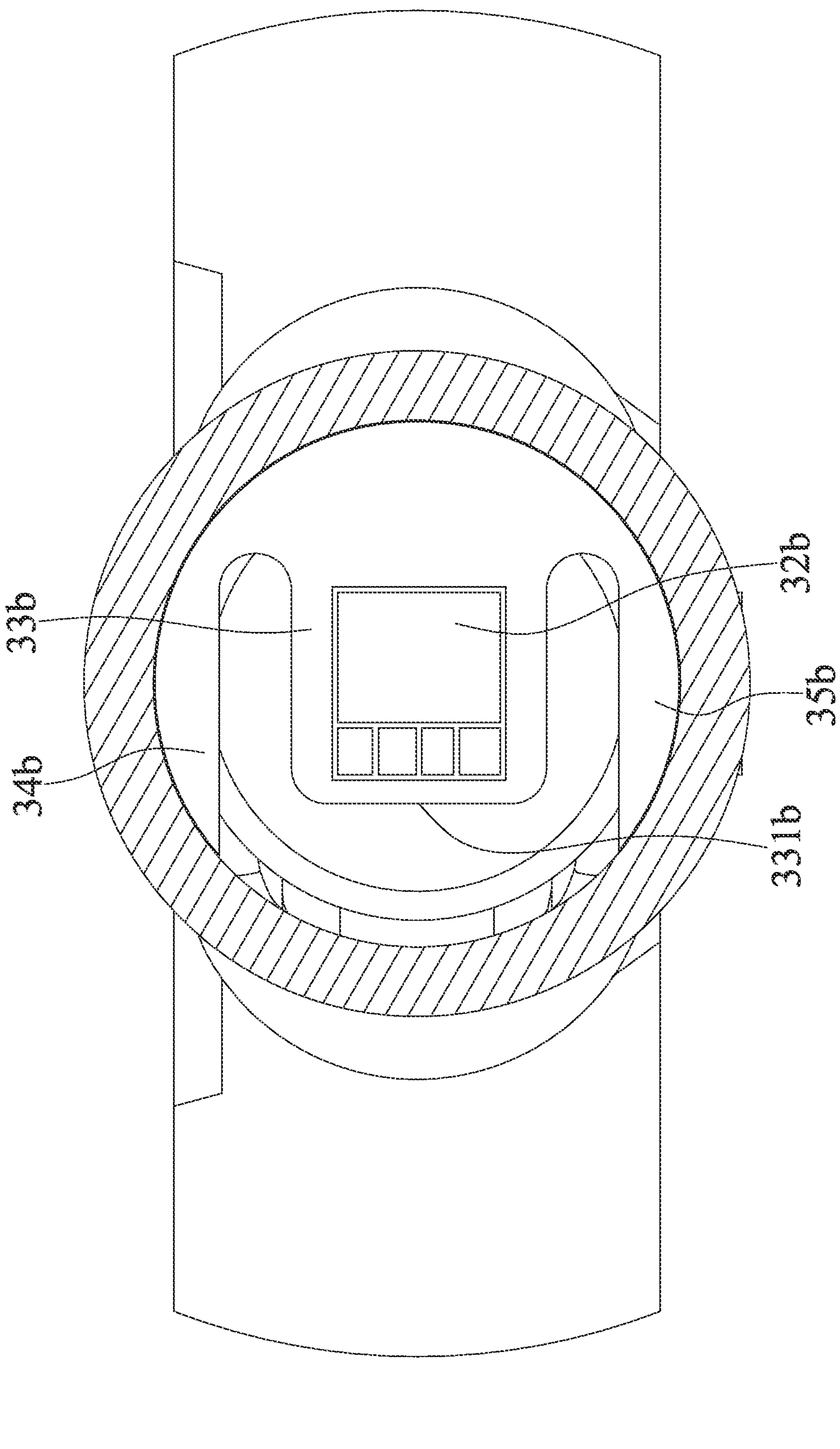
FIG. 8 is another cross sectional view of the torque wrench of the third embodiment according to the present invention.

FIGS. 6-8 show a torque wrench of a third embodiment according to the present invention. The third embodiment is substantially the same as the first embodiment but is mainly different from the first embodiment by that the body 20*b* is provided with a tripping mechanism 23*b* and an elastic member 24*b*. The elastic member 24*b* is arranged at a side of the tripping mechanism 23*b* opposite to the head portion 21. A side of the first leg 34*b* opposite to the tripping mechanism 23*b* and a side of the second leg 35*b* opposite to the tripping mechanism 23*b* are respectively abutted against the elastic member 24*b*. The third face 331*b* is faced to an inner periphery of the rod portion 22*b*. The strain gauge 32*b* is faced to the elastic member 24*b*. A side of the strain gauge seat 31*b* opposite to the elastic member 24*b* is abutted against the tripping mechanism 23*b*.

The tripping mechanism 23*b* is provided with a receiving slot 231*b*. The abutting portion 316*b* is arranged at a side of the deformation portion 33*b* opposite to the strain gauge 32*b*. In the embodiment, the abutting portion 316*b* has a spherical surface and is arranged in the receiving slot 231*b*. The abutting portion 316*b* abuts against an inner surface of the receiving slot 231*b* in a surface contact manner.

Figure 9:
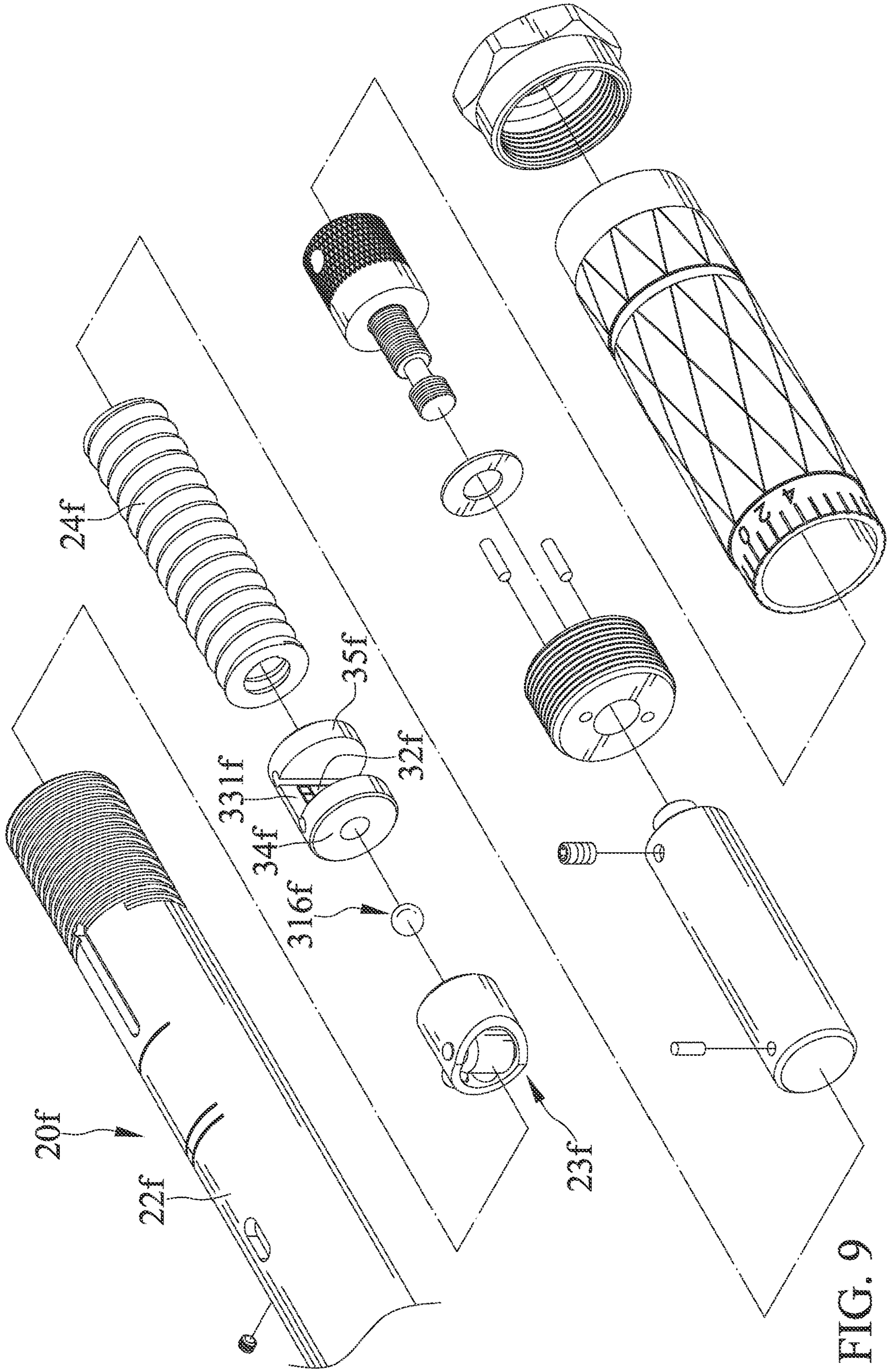
FIG. 9 is an exploded perspective view of a torque wrench of a fourth embodiment according to the present invention.
Figure 10:
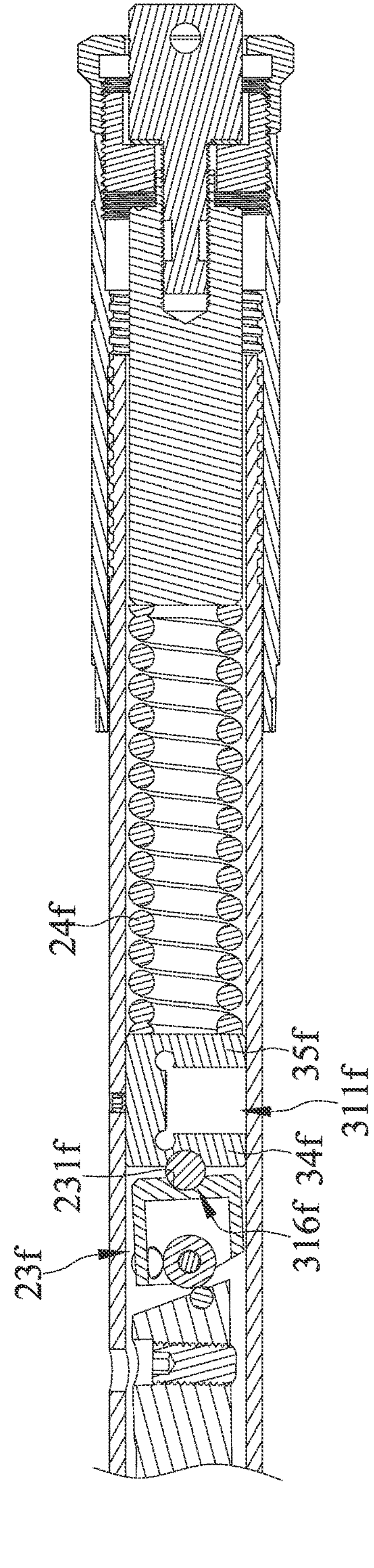
FIG. 10 is a cross sectional view of the torque wrench of the fourth embodiment according to the present invention.

FIGS. 9 and 10 show a torque wrench of a fourth embodiment according to the present invention. The fourth embodiment is substantially the same as the first embodiment but is mainly different from the first embodiment by that the body 20*f* is provided with a tripping mechanism 23*f* and an elastic member 24*f*. The elastic member 24*f* is arranged at a side of the tripping mechanism 23*f* opposite to the head portion 21. The first leg 34*f* is abutted against the tripping mechanism 23*f*. The second leg 35*f* is abutted against the elastic member 24*f*. The strain gauge 32*f* is connected to the third face 331*f* and is faced to an inner periphery of the rod portion 22*f*.

The tripping mechanism 23*f* is provided with a receiving slot 231*f*. The abutting portion 316*f* is arranged at a side of the first leg 34*f* opposite to the first recess 311*f*. In the embodiment, the abutting portion 316*f* has a spherical surface and is arranged in the receiving slot 231*f*. The abutting portion 316*f* abuts against an inner surface of the receiving slot 231*f* in a surface contact manner.

Figure 11:
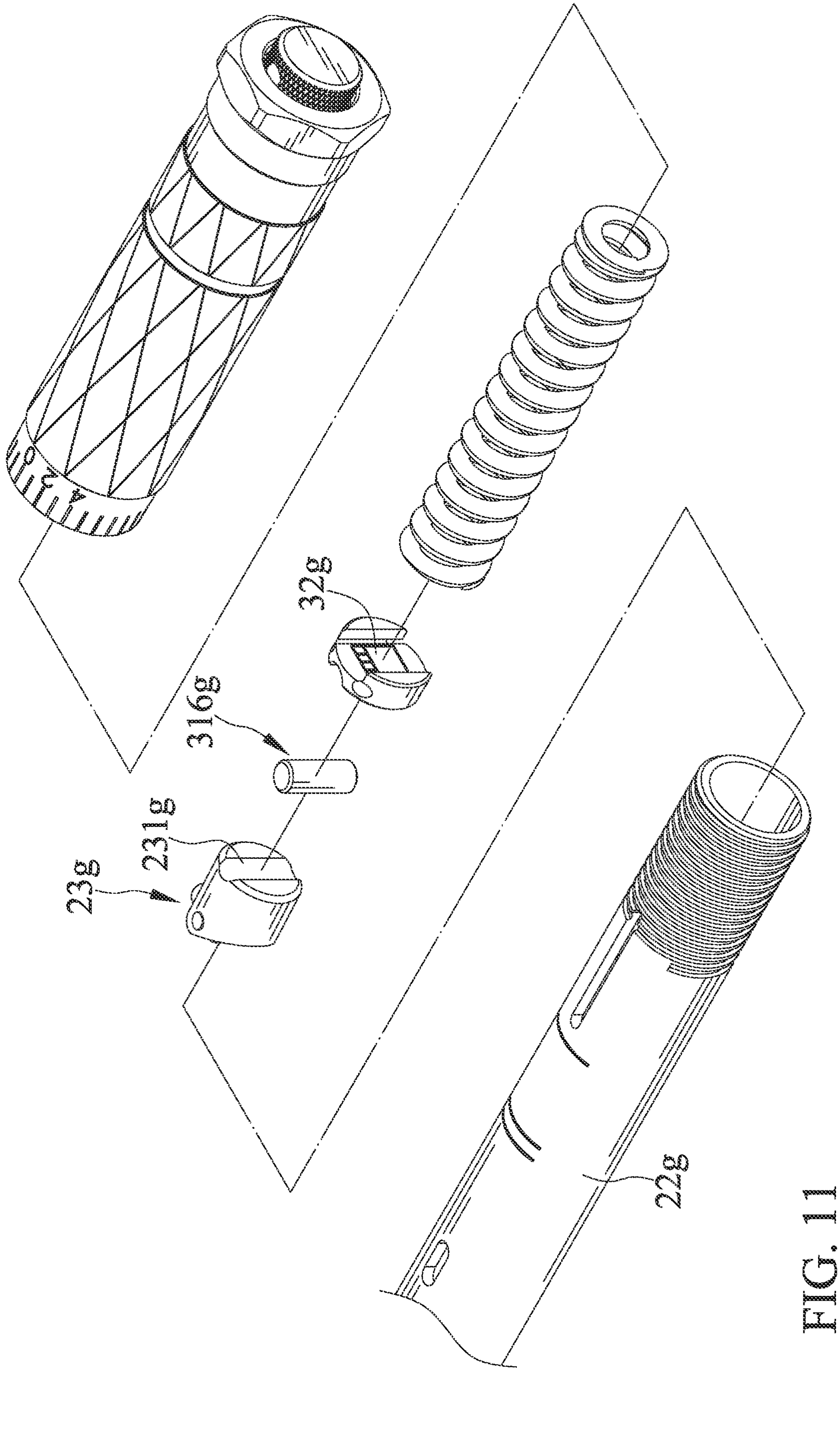
FIG. 11 is an exploded perspective view of a torque wrench of a fifth embodiment according to the present invention.
Figure 12:
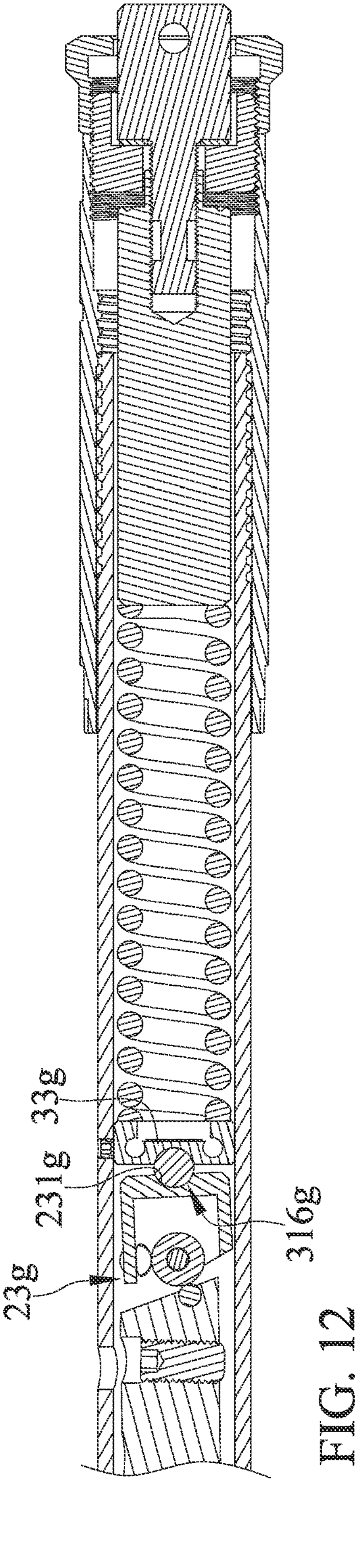
FIG. 12 is a cross sectional view of the torque wrench of the fifth embodiment according to the present invention.
Figure 13:
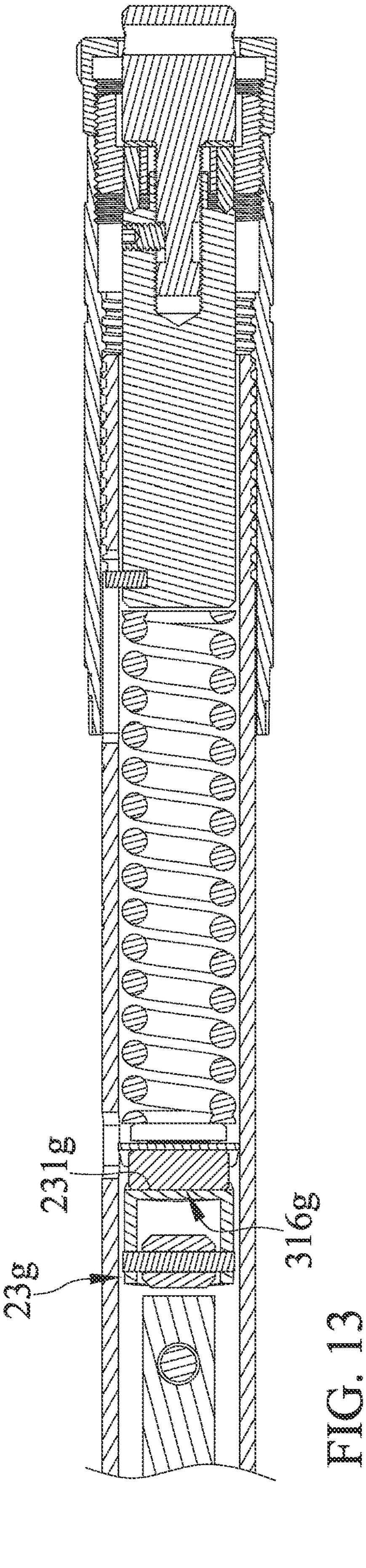
FIG. 13 is another cross sectional view of the torque wrench of the fifth embodiment according to the present invention.

FIGS. 11-13 show a torque wrench of a fifth embodiment according to the present invention. The fifth embodiment is substantially the same as the first embodiment but is mainly different from the first embodiment by that the tripping mechanism 23*g* is provided with a receiving slot 231*g*. The abutting portion 316*g* is arranged at a side of the deformation portion 33*g* opposite to the strain gauge 32*g*. In the embodiment, the abutting portion 316*g* has a cylindrical surface. The abutting portion 316*g* extends radially of the rod portion 22*g*. The abutting portion 316*g* is arranged in the receiving slot 231*g*. The abutting portion 316*g* abuts against an inner surface of the receiving slot 231*g* in a surface contact manner.

Figure 14:
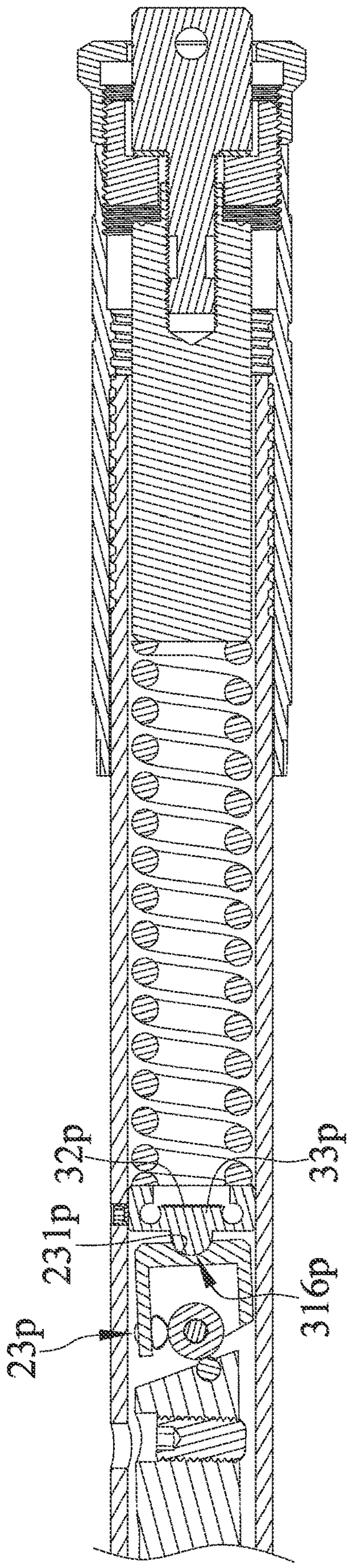
FIG. 14 is a cross sectional view of a torque wrench of the sixth embodiment according to the present invention.

FIG. 14 shows a torque wrench of a sixth embodiment according to the present invention. The sixth embodiment is substantially the same as the first embodiment but is mainly different from the first embodiment by that the tripping mechanism 23*p* is provided with a receiving slot 231*p*. The abutting portion 316*p* is arranged at a side of the deformation portion 33*p* opposite to the strain gauge 32*p*. The abutting portion 316*p* is integrally connected to the deformation portion 33*p* as a monolithic structure. The abutting portion 316*p* is arranged in the receiving slot 231*p*. The abutting portion 316*p* abuts against an inner surface of the receiving slot 231*p* in a surface contact manner.

Figure 15:
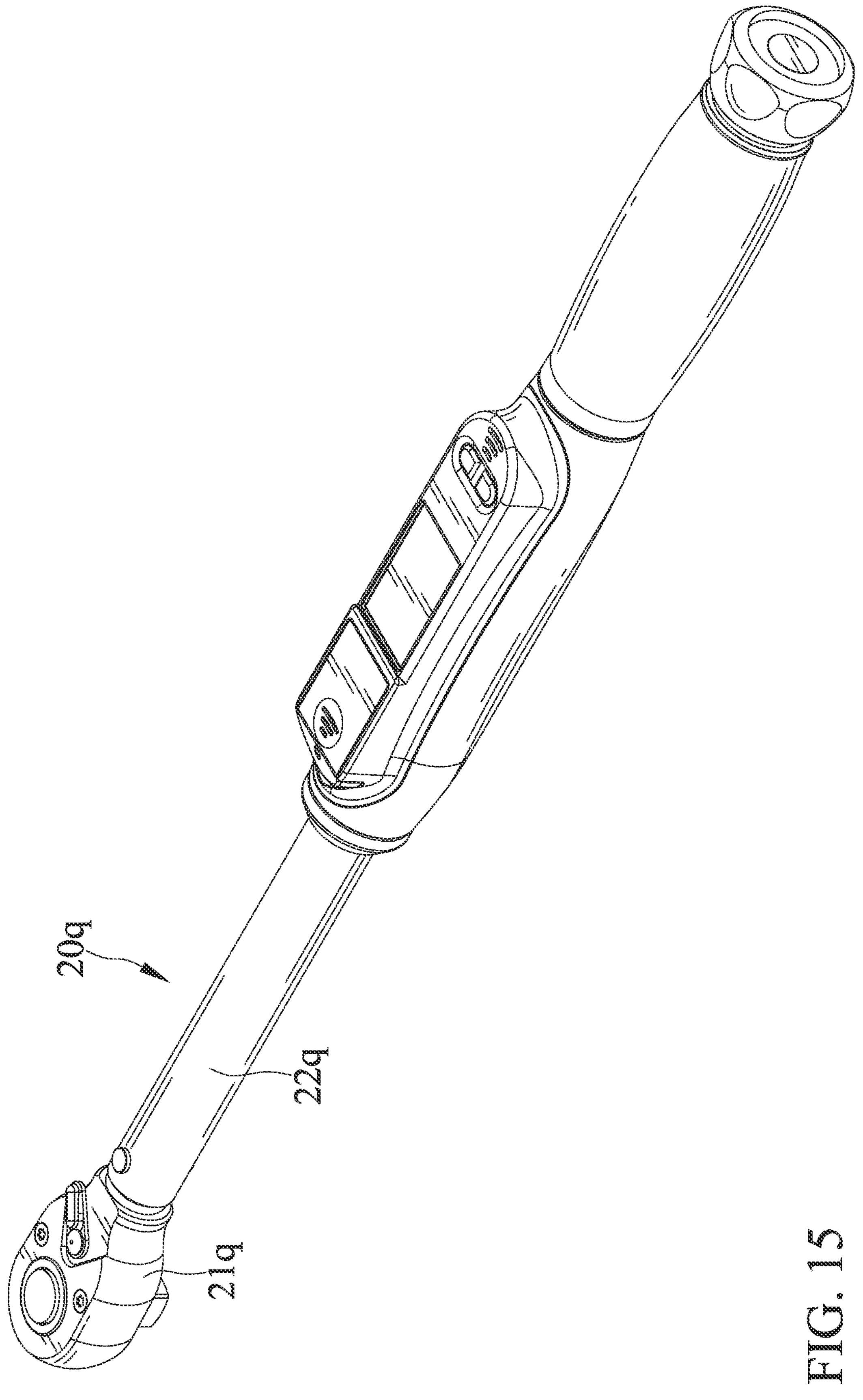
FIG. 15 is a perspective view of a torque wrench of a seventh embodiment according to the present invention.
Figure 16:
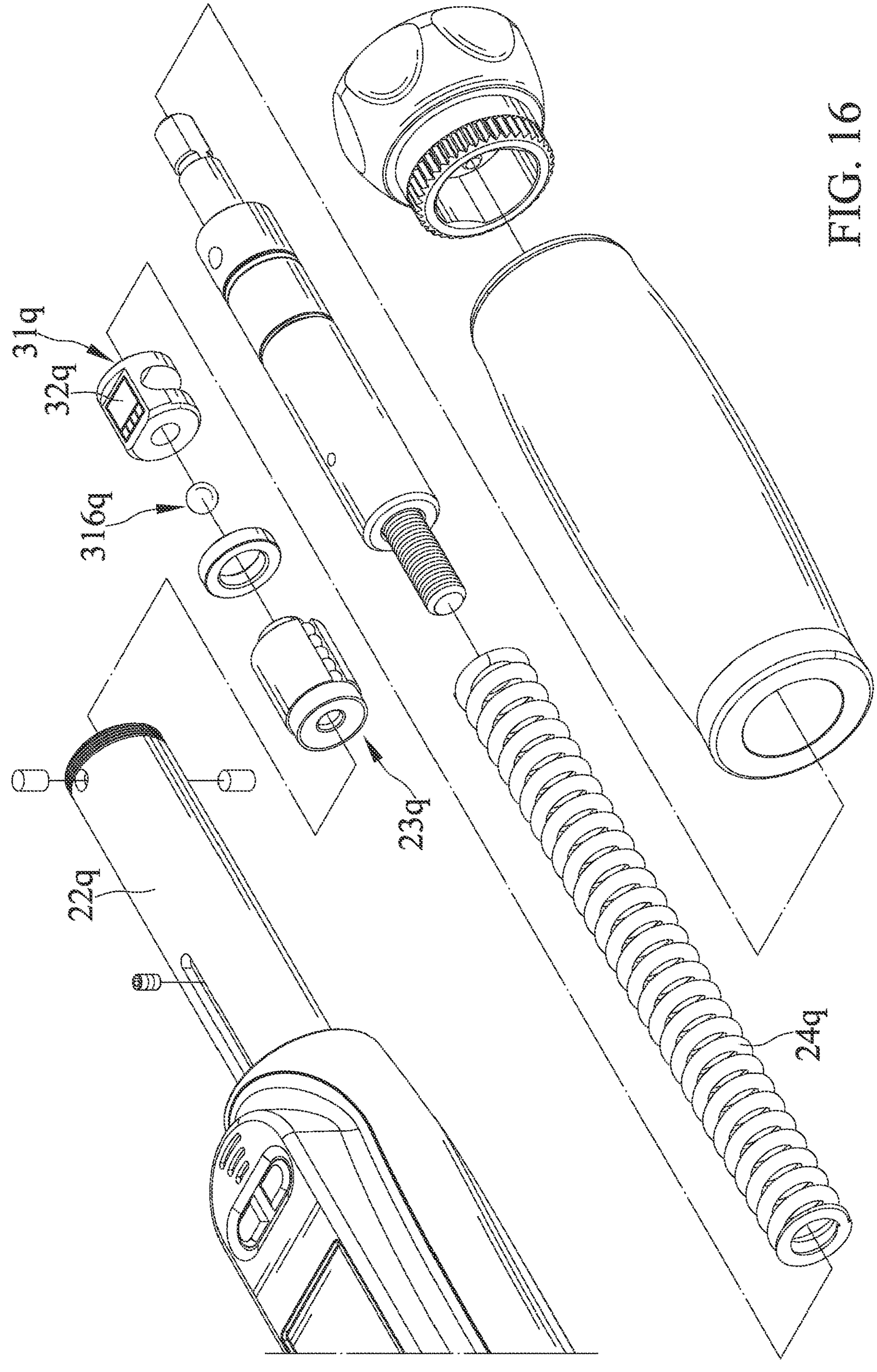
FIG. 16 is an exploded perspective view of the torque wrench of the seventh embodiment according to the present invention.
Figure 17:
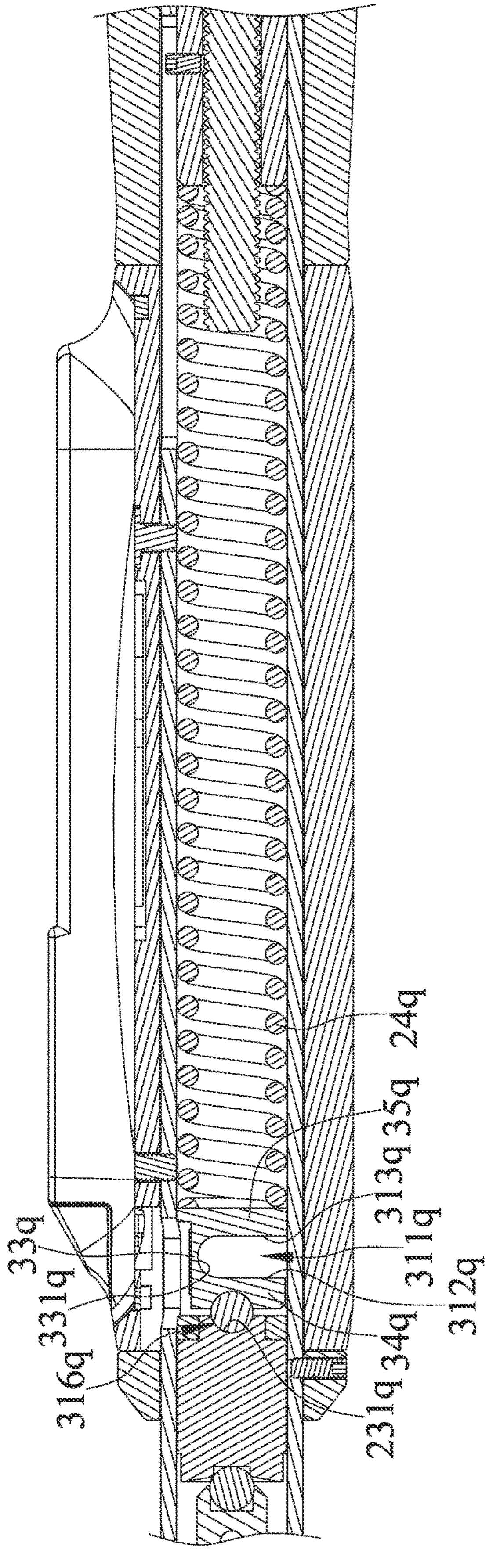
FIG. 17 is a cross sectional view of the torque wrench of the seventh embodiment according to the present invention.

FIGS. 15-17 show a torque wrench of a seventh embodiment according to the present invention. The seventh embodiment is substantially the same as the first embodiment but is mainly different from the first embodiment by that the strain gauge seat 31*q* is provided with a first leg 34*q* and a second leg 35*q*. The first recess 311*q* is arranged between the first leg 34*q* and the second leg 35*q*. The first leg 34*q* and the second leg 35*q* are respectively integrally connected to the deformation portion 33*q* as a monolithic structure. The first face 312*q* is arranged at a side of the first leg 34*q* adjacent to the first recess 311*q*. The second face 313*q* is arranged at a side of the second leg 35*q* adjacent to the first recess 311*q*. The first face 312*q* and the second face 313*q* are respectively connected to two opposite sides of the third face 331*q*.

The body 20*q* is provided with a tripping mechanism 23*q* and an elastic member 24*q*. The elastic member 24*q* is arranged at a side of the tripping mechanism 23*q* opposite to the head portion 21*q*. The first leg 34*q* is abutted against the tripping mechanism 23*q*. The second leg 35*q* is abutted against the elastic member 24*q*. The strain gauge 32*q* is connected to a side of the deformation portion 33*q* opposite to the third face 331*q* and is faced to an inner periphery of the rod portion 22*q*. The third face 331*q* is a concave arc surface.

The tripping mechanism 23*q* is provided with a receiving slot 231*q*. The abutting portion 316*q* is arranged at a side of the first leg 34*q* opposite to the first recess 311*q*. In the embodiment, the abutting portion 316*q* has a spherical surface and is arranged in the receiving slot 231*q*. The abutting portion 316*q* abuts against an inner surface of the receiving slot 231*q* in a surface contact manner.

Figure 18:
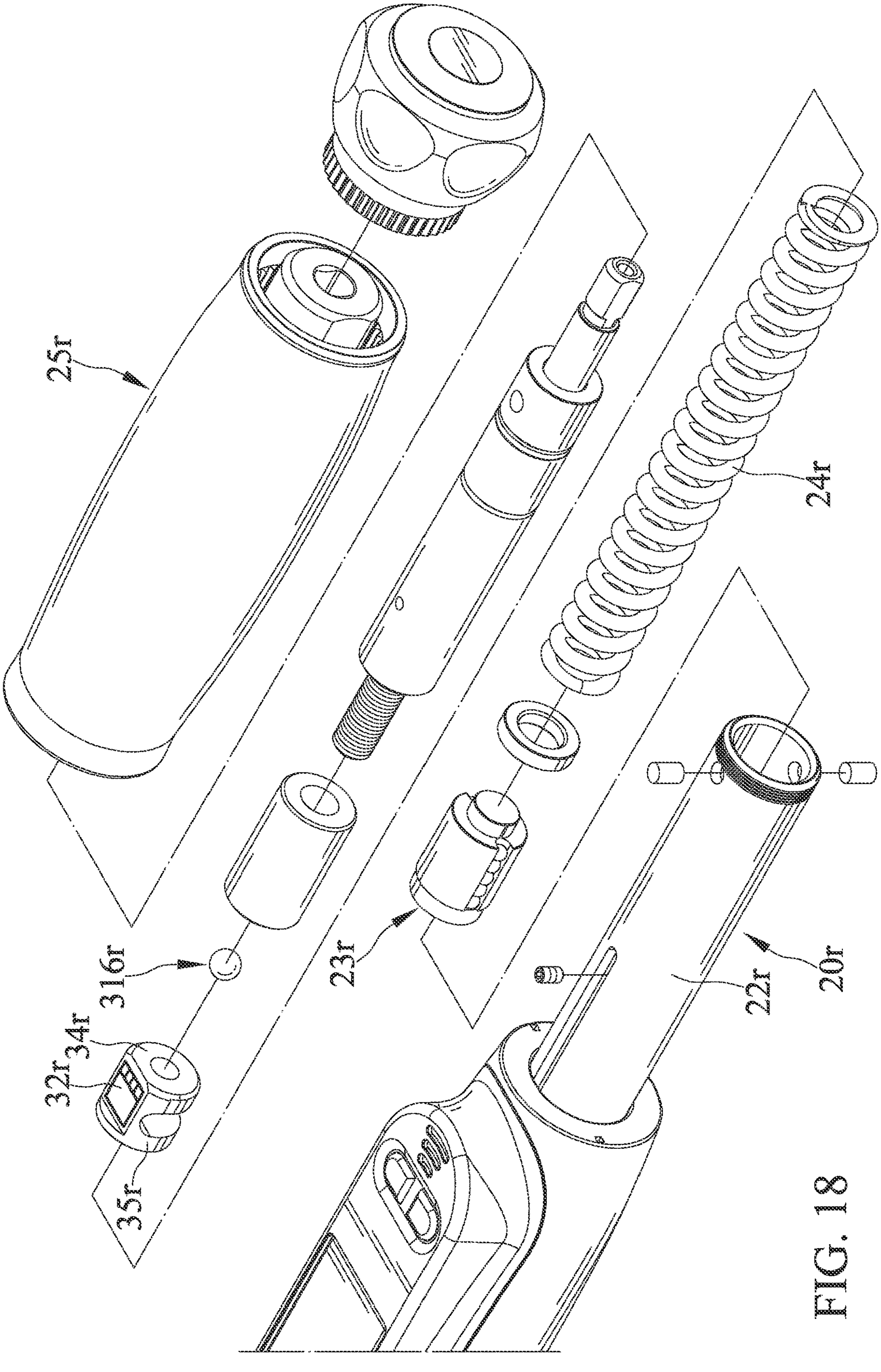
FIG. 18 is an exploded perspective view of a torque wrench of an eighth embodiment according to the present invention.
Figure 19:
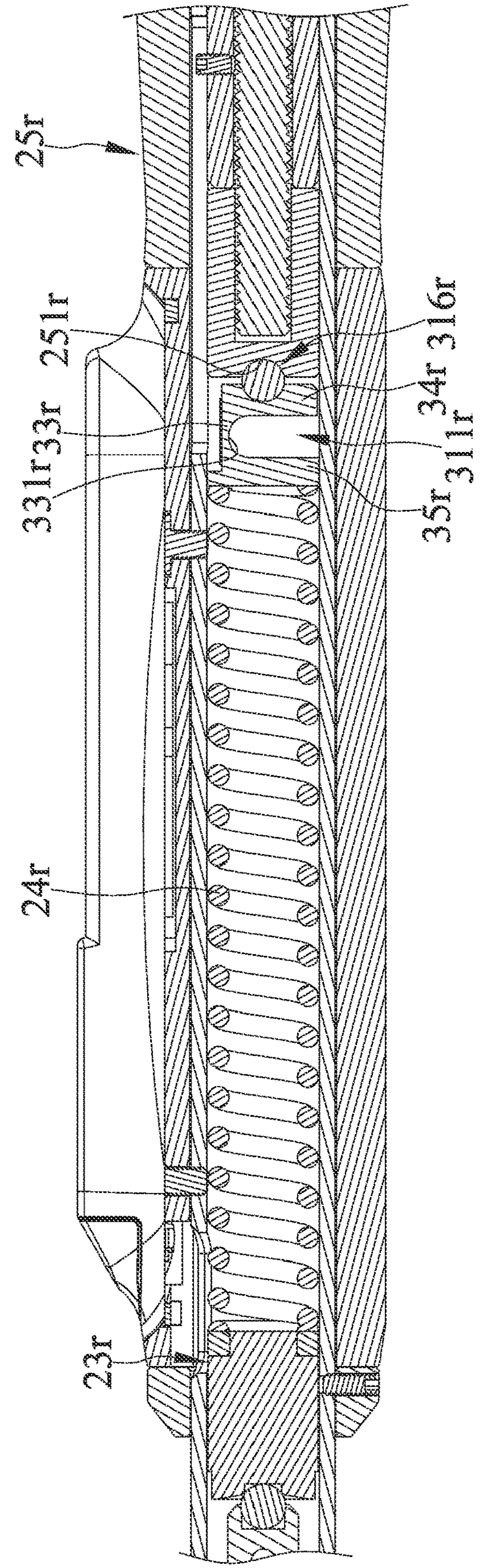
FIG. 19 is a cross sectional view of the torque wrench of the eight embodiment according to the present invention.

FIGS. 18-19 show a torque wrench of an eighth embodiment according to the present invention. The eighth embodiment is substantially the same as the seventh embodiment but is mainly different from the seventh embodiment by that the body 20*r* is provided with a tripping mechanism 23*r*, an elastic member 24*r* and an adjustable mechanism 25*r*. The elastic member 24*r* is arranged at a side of the tripping mechanism 23*r*. The elastic member 24*r* abuts against the tripping mechanism 23*r*. The adjustable mechanism 25*r* is arranged at a side of the elastic member 24*r* opposite to the tripping mechanism 23*r*. The first leg 34*r* is abutted against the adjustable mechanism 25*r*. The second leg 35*r* is abutted against the elastic member 24*r*. The strain gauge 32*r* is connected to a side of the deformation portion 33*r* opposite to the third face 331*r* and is faced to an inner periphery of the rod portion 22*r*. The third face 331*r* is a concave arc surface.

The adjustable mechanism 25*r* is provided with a receiving slot 251*r*. The abutting portion 316*r* is arranged at a side of the first leg 34*r* opposite to the first recess 311*r*. In the embodiment, the abutting portion 316*r* has a spherical surface and is arranged in the receiving slot 251*r*. The abutting portion 316*r* abuts against an inner surface of the receiving slot 251*r* in a surface contact manner.

Although specific embodiments have been illustrated and described, numerous modifications and variations are still possible without departing from the scope of the invention. The scope of the invention is limited by the accompanying claims.

The invention claimed is:

1. A torque wrench comprising:

a body including a head portion and a rod portion, wherein an end of the rod portion is connected with the head portion;

a measuring device including a strain gauge seat and a strain gauge, wherein the strain gauge seat is arranged in the rod portion and is provided with a first recess and a deformation portion adjacent to the first recess, wherein the strain gauge is connected to the deformation portion, wherein the strain gauge seat is further provided with an abutting portion, and wherein the abutting portion has a raised structure with a convex arc surface, wherein an inner periphery of the first recess is provided with a first face and a second face faced to the first face, and wherein a side of the deformation portion adjacent to the first recess is provided with a third face arranged between the first face and the second face, wherein the strain gauge seat is further provided with a first leg and a second leg, wherein the first recess is arranged between the first leg and the second leg, wherein the first leg and the second leg are respectively integrally connected to the deformation portion as a monolithic structure, wherein the first face is arranged at a side of the first leg adjacent to the first recess, wherein the second face is arranged at a side of the second leg adjacent to the first recess, and wherein the first face and the second face are respectively connected to two opposite sides of the third face, wherein the body is provided with a tripping mechanism and an elastic member, wherein the elastic member is arranged at a side of the tripping mechanism opposite to the head portion, wherein the first leg is abutted against the tripping mechanism, wherein the second leg is abutted against the elastic member, wherein the strain gauge is connected to a side of the deformation portion opposite to the third face and is faced to an inner periphery of the rod portion, and wherein the third face is a concave arc surface.

2. The torque wrench as claimed in claim 1, wherein the tripping mechanism is provided with a receiving slot, wherein the abutting portion is arranged at a side of the first leg opposite to the first recess, wherein the abutting portion has a spherical surface and is arranged in the receiving slot, and wherein the abutting portion abuts against an inner surface of the receiving slot.

3. A torque wrench as comprising:

a body including a head portion and a rod portion, wherein an end of the rod portion is connected with the head portion;

a measuring device including a strain gauge seat and a strain gauge, wherein the strain gauge seat is arranged in the rod portion and is provided with a first recess and a deformation portion adjacent to the first recess, wherein the strain gauge is connected to the deformation portion, wherein the strain gauge seat is further provided with an abutting portion, and wherein the abutting portion has a raised structure with a convex arc surface, wherein an inner periphery of the first recess is provided with a first face and a second face faced to the first face, and wherein a side of the deformation portion adjacent to the first recess is provided with a third face arranged between the first face and the second face, wherein the strain gauge seat is further provided with a first leg and a second leg, wherein the first recess is arranged between the first leg and the second leg, wherein the first leg and the second leg are respectively integrally connected to the deformation portion as a monolithic structure, wherein the first face is arranged at a side of the first leg adjacent to the first recess, wherein the second face is arranged at a side of the second leg adjacent to the first recess, and wherein the first face and the second face are respectively connected to two opposite sides of the third face, wherein the body is provided with a tripping mechanism, an elastic member and an adjustable mechanism, wherein the elastic member is arranged at a side of the tripping mechanism opposite to the head portion, wherein the elastic member abuts against the tripping mechanism, wherein the adjustable mechanism is arranged at a side of the elastic member opposite to the tripping mechanism, wherein the first leg is abutted against the adjustable mechanism, wherein the second leg is abutted against the elastic member, wherein the strain gauge is connected to a side of the deformation portion opposite to the third face and is faced to an inner periphery of the rod portion, and wherein the third face is a concave arc surface.

4. The torque wrench as claimed in claim 3, wherein the adjustable mechanism is provided with a receiving slot, wherein the abutting portion is arranged at a side of the first leg opposite to the first recess, wherein the abutting portion has a spherical surface and is arranged in the receiving slot, and wherein the abutting portion abuts against an inner surface of the receiving slot.

5. A torque wrench comprising:

a body including a head portion and a rod portion, wherein an end of the rod portion is connected with the head portion;

a measuring device including a strain gauge seat and a strain gauge, wherein the strain gauge seat is arranged in the rod portion and is provided with a first recess and a deformation portion adjacent to the first recess, wherein the strain gauge is connected to the deformation portion, wherein the strain gauge seat is further provided with an abutting portion, and wherein the abutting portion has a raised structure with a convex arc surface, wherein an inner periphery of the first recess is provided with a first face and a second face faced to the first face, and wherein a side of the deformation portion adjacent to the first recess is provided with a third face arranged between the first face and the second face, wherein the strain gauge seat is provided with a second recess and a third recess, wherein the second recess is arranged between the first face and the third face so that the first face and the third face are not connected with each other, wherein the second recess communicates with the first recess, wherein the third recess is arranged between the second face and the third face so that the second face and the third face are not connected with each other, and wherein the third recess communicates with the first recess, wherein the strain gauge seat is provided with a first leg and a second leg, wherein the first recess is arranged between the first leg and the second leg, wherein the first leg and the second leg are respectively integrally connected to the deformation portion as a monolithic structure, wherein the first face is arranged at a side of the first leg adjacent to the first recess, and wherein the second face is arranged at a side of the second leg adjacent to the first recess, wherein the body is provided with a tripping mechanism and an elastic member, wherein the elastic member is arranged at a side of the tripping mechanism opposite to the head portion, wherein the first leg is abutted against the tripping mechanism, wherein the second leg is abutted against the elastic member, and wherein the strain gauge is connected to the third face and is faced to an inner periphery of the rod portion.

6. The torque wrench as claimed in claim 5, wherein the tripping mechanism is provided with a receiving slot, wherein the abutting portion is arranged at a side of the first leg opposite to the first recess, wherein the abutting portion is arranged in the receiving slot, and wherein the abutting portion abuts against an inner surface of the receiving slot.

7. A torque wrench comprising:

a body including a head portion and a rod portion, wherein an end of the rod portion is connected with the head portion;

a measuring device including a strain gauge seat and a strain gauge, wherein the strain gauge seat is arranged in the rod portion and is provided with a first recess and a deformation portion adjacent to the first recess, wherein the strain gauge is connected to the deformation portion, wherein the strain gauge seat is further provided with an abutting portion, and wherein the abutting portion has a raised structure with a convex arc surface, wherein an inner periphery of the first recess is provided with a first face and a second face faced to the first face, and wherein a side of the deformation portion adjacent to the first recess is provided with a third face arranged between the first face and the second face, wherein the strain gauge seat is provided with a second recess and a third recess, wherein the second recess is arranged between the first face and the third face so that the first face and the third face are not connected with each other, wherein the second recess communicates with the first recess, wherein the third recess is arranged between the second face and the third face so that the second face and the third face are not connected with each other, and wherein the third recess communicates with the first recess, wherein the strain gauge seat is provided with a first leg and a second leg, wherein the first recess is arranged between the first leg and the second leg, wherein the first leg and the second leg are respectively integrally connected to the deformation portion as a monolithic structure, wherein the first face is arranged at a side of the first leg adjacent to the first recess, and wherein the second face is arranged at a side of the second leg adjacent to the first recess, wherein the body is provided with a tripping mechanism, an elastic member and adjustable mechanism, wherein the elastic member is arranged at a side of the tripping mechanism opposite to the head portion, wherein the elastic member abuts against the tripping mechanism, wherein the adjustable mechanism is arranged at a side of the elastic member opposite to the tripping mechanism, wherein the first leg is abutted against the adjustable mechanism, wherein the second leg is abutted against the elastic member, and wherein the strain gauge is connected to the third face and is faced to an inner periphery of the rod portion.

8. The torque wrench as claimed in claim 7, wherein the adjustable mechanism is provided with a receiving slot, wherein the abutting portion is arranged at a side of the first leg opposite to the first recess, wherein the abutting portion is arranged in the receiving slot, and wherein the abutting portion abuts against an inner surface of the receiving slot.

9. A torque wrench comprising:

a body including a head portion and a rod portion, wherein an end of the rod portion is connected with the head portion;

a measuring device including a strain gauge seat and a strain gauge, wherein the strain gauge seat is arranged in the rod portion and is provided with a first recess and a deformation portion adjacent to the first recess, wherein the strain gauge is connected to the deformation portion, wherein the strain gauge seat is further provided with an abutting portion, and wherein the abutting portion has a raised structure with a convex arc surface, wherein an inner periphery of the first recess is provided with a first face and a second face faced to the first face, and wherein a side of the deformation portion adjacent to the first recess is provided with a third face arranged between the first face and the second face, wherein the strain gauge seat is provided with a second recess and a third recess, wherein the second recess is arranged between the first face and the third face so that the first face and the third face are not connected with each other, wherein the second recess communicates with the first recess, wherein the third recess is arranged between the second face and the third face so that the second face and the third face are not connected with each other, and wherein the third recess communicates with the first recess, wherein the strain gauge seat is provided with a first leg and a second leg, wherein the first recess is arranged between the first leg and the second leg, wherein the first leg and the second leg are respectively integrally connected to the deformation portion as a monolithic structure, wherein the first face is arranged at a side of the first leg adjacent to the first recess, and wherein the second face is arranged at a side of the second leg adjacent to the first recess, wherein the body is provided with a tripping mechanism and an elastic member, wherein the elastic member is arranged at a side of the tripping mechanism opposite to the head portion, wherein a side of the first leg opposite to the tripping mechanism and a side of the second leg opposite to the tripping mechanism are respectively abutted against the elastic member, wherein the third face is faced to an inner periphery of the rod portion, wherein the strain gauge is faced to the elastic member, and wherein a side of the strain gauge seat opposite to the elastic member is abutted against the tripping mechanism.

10. The torque wrench as claimed in claim 9, wherein the tripping mechanism is provided with a receiving slot, wherein the abutting portion is arranged at a side of the deformation portion opposite to the strain gauge, wherein the abutting portion is arranged in the receiving slot, and wherein the abutting portion abuts against an inner surface of the receiving slot.

11. A torque wrench comprising:

a body including a head portion and a rod portion, wherein an end of the rod portion is connected with the head portion;

a measuring device including a strain gauge seat and a strain gauge, wherein the strain gauge seat is arranged in the rod portion and is provided with a first recess and a deformation portion adjacent to the first recess, wherein the strain gauge is connected to the deformation portion, wherein the strain gauge seat is further provided with an abutting portion, and wherein the abutting portion has a raised structure with a convex arc surface, wherein an inner periphery of the first recess is provided with a first face and a second face faced to the first face, and wherein a side of the deformation portion adjacent to the first recess is provided with a third face arranged between the first face and the second face, wherein the strain gauge seat is provided with a second recess and a third recess, wherein the second recess is arranged between the first face and the third face so that the first face and the third face are not connected with each other, wherein the second recess communicates with the first recess, wherein the third recess is arranged between the second face and the third face so that the second face and the third face are not connected with each other, and wherein the third recess communicates with the first recess, wherein the strain gauge seat is provided with a first leg and a second leg, wherein the first recess is arranged between the first leg and the second leg, wherein the first leg and the second leg are respectively integrally connected to the deformation portion as a monolithic structure, wherein the first face is arranged at a side of the first leg adjacent to the first recess, and wherein the second face is arranged at a side of the second leg adjacent to the first recess, wherein the body is provided with a tripping mechanism and an elastic member, wherein the elastic member is arranged at a side of the tripping mechanism opposite to the head portion, wherein a side of the first leg opposite to the deformation portion and a side of the second leg opposite to the deformation portion are respectively abutted against the elastic member, wherein the strain gauge is connected to the third face and is faced to the elastic member, and wherein a side of the strain gauge seat opposite to the elastic member is abutted against the tripping mechanism.

12. The torque wrench as claimed in claim 11, wherein the tripping mechanism is provided with a receiving slot, wherein the abutting portion is arranged at a side of the deformation portion opposite to the strain gauge, wherein the abutting portion includes a containing slot and an abutting member, wherein the containing slot is recessed in the deformation portion, wherein the abutting member is spherical, wherein the abutting member is arranged in the receiving slot and the containing slot, and wherein the abutting member simultaneously abuts against an inner surface of the receiving slot and an inner surface of the containing slot in a surface contact manner.

13. The torque wrench as claimed in claim 11, wherein the tripping mechanism is provided with a receiving slot, wherein the abutting portion is arranged at a side of the deformation portion opposite to the strain gauge, wherein the abutting portion is integrally connected to the deformation portion as a monolithic structure, wherein the abutting portion is arranged in the receiving slot, and wherein the abutting portion abuts against an inner surface of the receiving slot in a surface contact manner.

14. The torque wrench as claimed in claim 11, wherein the tripping mechanism is provided with a receiving slot, wherein the abutting portion is arranged at a side of the deformation portion opposite to the strain gauge, wherein the abutting portion has a cylindrical surface, wherein the abutting portion extends radially of the rod portion, wherein the abutting portion is arranged in the receiving slot, and wherein the abutting portion abuts against an inner surface of the receiving slot.

* * * * *